United States Patent
Katoh et al.

(10) Patent No.: US 7,155,550 B2
(45) Date of Patent: Dec. 26, 2006

(54) PROGRAM-EXECUTING APPARATUS AND PORTABLE INFORMATION PROCESSING APPARATUS

(75) Inventors: Motoyuki Katoh, Kyoto (JP); Kozo Moriyama, Kyoto (JP); Yosuke Baba, Kyoto (JP)

(73) Assignee: Omron Corporation, Kyoto (JP)

( * ) Notice: Subject to any disclaimer, the term of this patent is extended or adjusted under 35 U.S.C. 154(b) by 676 days.

(21) Appl. No.: 10/159,597

(22) Filed: May 30, 2002

(65) Prior Publication Data

US 2002/0184289 A1    Dec. 5, 2002

(30) Foreign Application Priority Data

May 30, 2001   (JP)   ............... 2001-163271

(51) Int. Cl.
*G06F 12/00*   (2006.01)
(52) U.S. Cl. ............... 710/200; 718/102; 718/104; 718/106; 718/107
(58) Field of Classification Search ........ 718/100–103, 718/104–107; 710/200, 220
See application file for complete search history.

(56) References Cited

U.S. PATENT DOCUMENTS

| | | | | |
|---|---|---|---|---|
| 5,414,814 A | * | 5/1995 | McKim | ............... 710/1 |
| 5,537,602 A | * | 7/1996 | Kametani | ............... 712/38 |

FOREIGN PATENT DOCUMENTS

| | | |
|---|---|---|
| EP | 0 981 085 A2 | 2/2000 |
| JP | 10-3463 | 1/1998 |
| JP | 2000-99349 | 4/2000 |
| JP | 2000-105753 | 4/2000 |

OTHER PUBLICATIONS

Patent Abstracts of Japan, Publication No. 04-199355, Jul. 20, 1992, 2 pgs.
Patent Abstracts of Japan, Publication No. 11-249997, Sep. 17, 1999, 2 pgs.
Patent Abstracts of Japan, Publication No. 2000-099349, corresponding to EP-0 981 085 A2, Publication Date: Apr. 07, 2000, 2 pages.
Patent Abstracts of Japan, Publication No. 10-003463, Publication Date: Jan. 06, 1998, 2 pages.
Patent Abstracts of Japan, Publication No. 2000-105753, Publication Date: Apr. 11, 2000, 2 pages.
Japanese Office Action for Japanese patent application No. 2001-163271 and English translation thereof, 2 pages.

* cited by examiner

*Primary Examiner*—Meng-Al T. An
*Assistant Examiner*—Lilian Vo
(74) *Attorney, Agent, or Firm*—Osha Liang LLP

(57) ABSTRACT

A program-executing apparatus has a simple configuration, is capable of executing high-speed processing, and is capable of providing high security. The apparatus is configured such that a host system wherein a program execution environment using a general-purpose OS 16 is set and a subsystem 200 wherein a virtual-machine execution environment is set are built into independent operation circuits, and a DPRAM 3 is coupled to a general-purpose bus that connects the two operation circuits. In one of the systems 100 and 200, when a process to be requested to the other system has occurred, an interface built into each of the systems writes a command indicative of the contents of the process into the DPRAM, and outputs an interrupt to the remote system; and in response to an interrupt notified from the other system, the interface executes a process of reading a command written by the DPRAM 3.

4 Claims, 10 Drawing Sheets

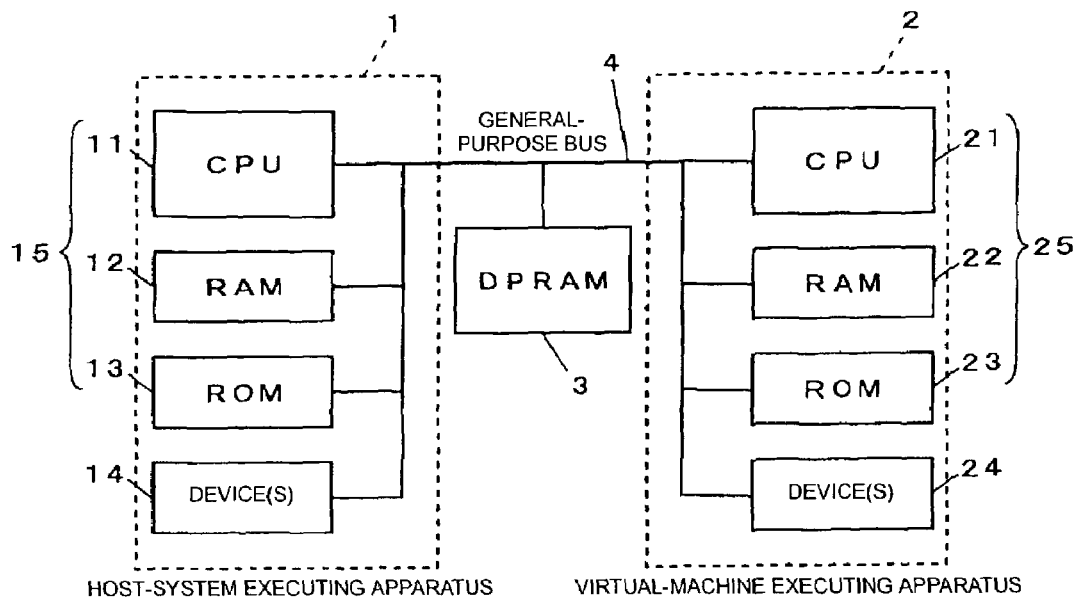
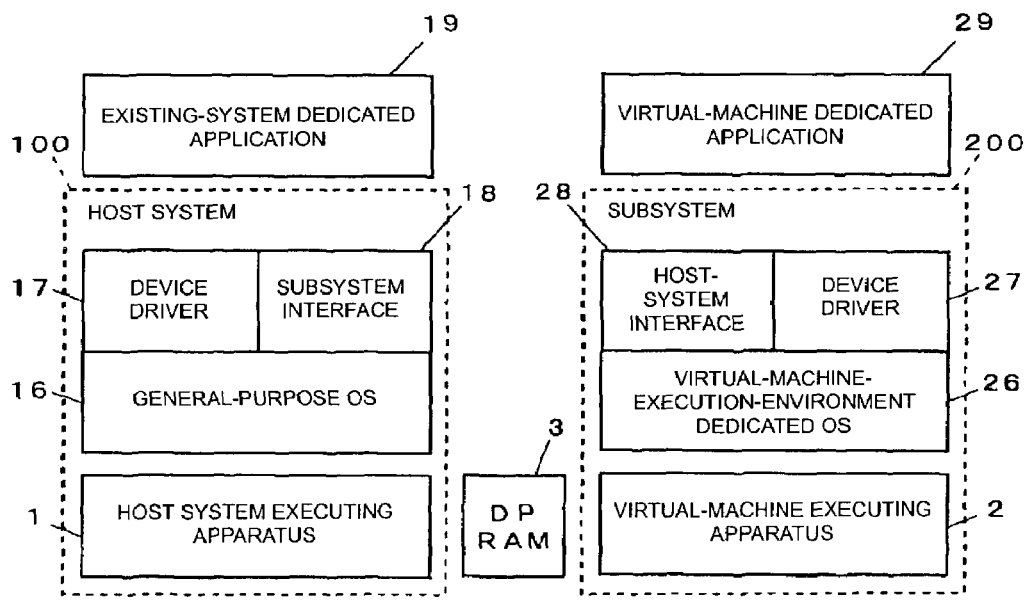

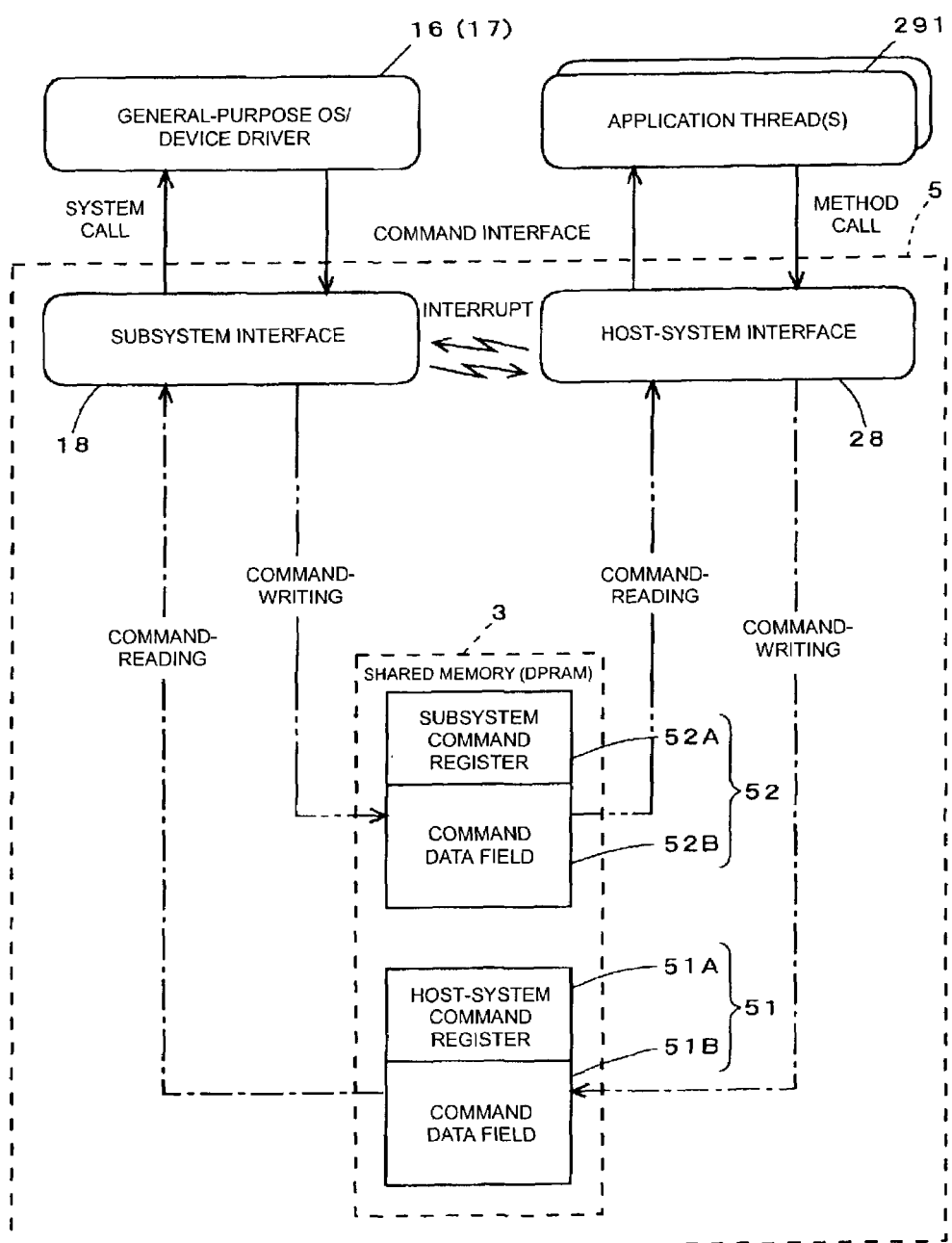

Fig. 4
(1) COMMAND REGISTER
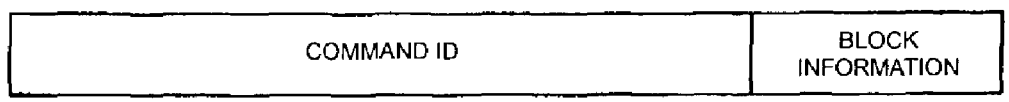
(2) COMMAND DATA FIELD
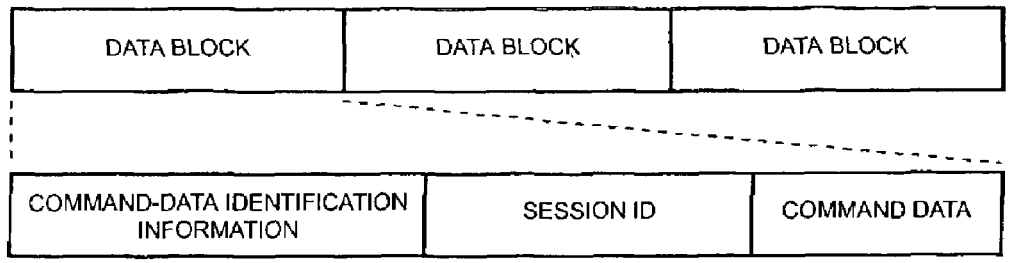

PROGRAM-EXECUTING APPARATUS AND PORTABLE INFORMATION PROCESSING APPARATUS

BACKGROUND OF THE INVENTION

1. Field of the Invention

The present invention relates to an apparatus in which a program execution environment is set for executing predetermined processing (the apparatus hereinbelow will also be referred to as a "program-executing apparatus"); more specifically, the present invention relates to a program-executing apparatus in which two differently configured program execution environments are set, and also to a portable information processing apparatus using the aforementioned program-executing apparatus.

2. Description of the Background Art

Recently, according to the development in computer networks, various applications can be downloaded into a communication terminal and can thereby be used with the terminal. In addition, using Java (registered trademark; and "Java" hereinbelow will be shown as "Java™") developed by Sun Microsystems, Inc., various JaVa™-compatible applications are thereby abled to be operated by setting a program execution environment in which a platform-independent "virtual machine" is operable (the aforementioned program execution environment hereinbelow will be referred to as a "virtual-machine execution environment"). Particularly, in the field of portable information processing apparatuses such as portable telephones and PDAs, the development has advanced to an extent that apparatuses having functions unavailable with conventional models are used. The functions include, for example, a function in which a virtual-machine execution environment is set to display motion images and to form a complicated user interface.

Generally, a virtual-machine execution environment has a configuration as shown in FIG. 11.

In the figure, numeral 70 denotes an OS (operating system) used as a platform, and numeral 71 denotes an application(s) having a program configuration compatible with the OS 70 (the application hereinbelow will be referred to as an "existing-system dedicated application(s) 71"). In a state where a virtual machine 80 is not built in, the OS 70 sets a program execution environment for operating only the existing-system dedicated application 71 (hereinbelow, the OS 70 in the aforementioned state will be referred to as a "general-purpose OS 70", and the system for operating only the existing-system dedicated application 71 will be referred to as an "existing system".)

The virtual machine 80 functions as an OS for operating a Java™-compatible application(s) 81 (shown in the figure as "virtual-machine dedicated application(s) 81") on the OS 70 of the existing system. Specifically, when the virtual machine 80 is used to perform processing, a command in byte code representing the contents of the processing is passed from the Java™-compatible application 81 to the virtual machine 80, emulation according to the command is performed between the virtual machine 80 and the OS 70, and the processing required by the Java™-compatible application 81 is thereby executed.

The above-mentioned virtual-machine execution environment is of course set with hardware resources, such as a CPU 90 and a memory 91 (corresponding to a ROM 92 and a RAM 93 that are shown in FIG. 12). As shown by arrow-end dotted lines in the figure, the individual applications 71 and 81 share the memory 91 through the OS 70 and the CPU 90.

FIG. 12 shows another system configuration in which a virtual-machine execution environment is set. The software configuration of the system is similar to that shown in FIG. 11. However, the hardware configuration is arranged such that a second CPU 95 is coupled as an accelerator to a CPU 91, and an OS 70 is used to process a command sent from a virtual machine 80, wherein processing is performed by passing the command to the second CPU 95 so that the processing is speeded up. Thus, the virtual-machine execution environment is set with hardware, such as the second CPU 95, the CPU 91, and various devices 94, and the virtual machine 80, as shown in the dotted-line frame in the figure.

As in the conventional configuration, for example, only the existing CPU 91 can handle, for example, a case where only an existing-system dedicated application 71 is operated or a case where the virtual machine 80 performs processing using functions of the existing system.

FIG. 13 shows a third system configuration in which a virtual-machine operation environment is set. The system is configured such that an existing system and a virtual-machine execution environment are individually set with independent hardware resources, and CPUs 91 and 91*a* are coupled. The hardware configuration of the virtual-machine execution environment (configured of, for example, the CPU 91*a*, a ROM 92*a*, a RAM 93*a*, and devices 94*a*) is similar to the configuration of the existing system. However, in addition to the functions of the virtual machine 80 shown in FIG. 11 or 12, the software includes a built-in dedicated OS 82 in which other functions are set, including a function of exchanging data with the existing system and a function of controlling the memories and the devices. In a configuration in which the virtual-machine dedicated application 81 uses a function of the existing system, a command is issued between the dedicated OS 82 and the general purpose OS 70 of the existing system. Concurrently, communication is performed therebetween to send the execution result of the processing performed in response to the aforementioned command.

In the system shown in FIG. 11, since the virtual machine 80 is driven according to the emulation of the OS 70, a problem arises in that the execution speed for the virtual-machine dedicated application 81 is decreased. In addition, since the existing-system dedicated application 71 is operated on the same OS 70 that also drives the virtual machine 80, resource competition tends to occur, and influences thereof to the existing-system dedicated application 71 are unavoidable. As such, programs need to be modified. Also in the virtual-machine execution environment, operations such as those for thread management and memory management need to be performed to be compatible with the OS 70. These matters require program modifications, thereby arising problems of increasing costs and time.

Moreover, the same memories and devices are shared between the existing system and the virtual-machine execution environment. As such, when a program such as a hazardous program or a program not sufficiently verified is built thereinto as the virtual-machine dedicated application 81, the whole system can be destructed.

In the system shown in FIG. 12, the second CPU 95 functioning as the accelerator enables the virtual-machine dedicated application 81 to perform high-speed execution. However, a necessity arises for modification of the configuration of the existing CPU 91 in order to connect the second CPU 95. Moreover, also in this system, members such as memories 91 and devices 94 are shared between the existing system and the virtual-machine execution environment. In this case, a problem occurs in that the security is decreased.

In the system shown in FIG. 13, the hardware in the existing system is independent of the hardware in the virtual-machine execution environment. Thereby, security higher than that in either of the systems shown in FIGS. 11 and 12 can be secured. However, each of the OSs needs to parallely execute processing according to a command issued in the system and processing according to a command received from the differently configured OS. This arises a problem in that exclusive resource control is complicated.

Thus, in the conventional systems in which the individual virtual-machine execution environments, there cause the problems in that, for example, the hardware configuration and/or the software configuration is complicated, and sufficient security cannot be secured. The present invention is made in view of these problems. Accordingly, an object of the present invention is to provide a program-executing apparatus that has a simple configuration, that enables a virtual machine to execute processing at a high speed, and that exhibits high security.

Furthermore, a second object of the present invention is to provide a portable information processing apparatus at a low cost by using an existing-apparatus circuit configuration, the portable information processing apparatus being configured by including the aforementioned program-executing apparatus to thereby become capable of performing high-speed processing in the virtual-machine execution environment.

SUMMARY OF THE INVENTION

A program-executing apparatus is configured such that two types of systems that run in different program execution environments are individually set into two operation circuits, the operation circuits are connected together, and a shared memory usable by the two operation circuits is connected to a path connecting the individual operation circuits.

The aforementioned "operation circuit" refers to a circuit that includes a CPU as a main component and memories such as a RAM and a ROM and that can be connected with devices such as an input/output section and external memories. The "program execution environment" refers to an environment in which predetermined programs are operated and that is ordinarily configured of an operation circuit provided as hardware and an OS provided as software. In the present invention, a configuration including hardware and software that form the program execution environment is referred to as a "system".

In the aforementioned two types of systems, the individual program execution environments therefor are set by OSs having configurations different from each other. For example, a virtual-machine execution environment corresponding to a Java™ virtual machine is set into one of the operation circuits, and a program execution environment with an OS (the aforementioned general-purpose OS) not having the virtual-machine execution environment is set into the other operation circuit.

The aforementioned shared memory is formed of a memory such as a dual-port RAM that can be bidirectionally accessed. When a configuration is built such that the two operation circuits and the shared memory are mounted on the same substrate, the configuration can be built into the above-described apparatus to function as a control section of an information processing apparatus that executes predetermined processing.

In addition, a command-relaying means is provided in each of the systems of the present invention, wherein when a process requested to the other system has occurred, the command-relaying means executes write control so that a command indicative of the contents of the process is written into the shared memory, and the other system is caused to occur an interrupt and executes read control so that in response to the occurrence of an interrupt, the command is read from the shared memory.

The expression "process requested to the other system" refers to a process executable by a function that does not exist in the local system and that exists in the other system. In other words, the process refers to a process that needs to reference resources under the management of the other system. For example, the process corresponds to a process to be performed in, for example, a case where in the relationship between the above-described virtual-machine execution environment and existing system, key-input information is passed from the existing system to the virtual-machine execution environment, or a virtual-machine dedicated application uses font data available in the existing system in order to display data.

According to the thus-configured program-executing apparatus, since the two systems are set in the discrete operation circuits, applications individually built into the systems can synchronously be operated. In this case, when a process using a function of the other system needs to be performed in the one system, the command-relaying means of the system writes a command indicative of the contents of the process into the shared memory, and causes the other system to occur an interrupt. Thereby, the command-relaying means of the other system fetches the command, and executes the process indicated in the data.

In addition, when the system that accepted the command needs to send the processing result of the command in response, the command-relaying means of the system that has executed the process writes the command indicative of fetching of the processing result and the processing result into the shared memory, and then causes the other system to occur an interrupt. Thereby, the command-relaying means of the remote system can fetch the result of the process that has occurred.

In this way, the thus-configured shared memory and the command-relaying means of each of the systems function as an interface for implementing, for example, transmission of a command to the other system and reception of the command. The components such as the operation circuits and the shared memory can easily be coupled using general-purpose buses; and in addition, the configuration of software other than that of the command-relaying means need not greatly be modified, and the individual systems can be synchronously operated with the discrete hardware. As such, improvement in processing at a high speed and cost reduction can be implemented.

In addition, the resources are conditioned not to be shared between the systems, and the command-relaying means is used to spontaneously read a command from the shared memory in response to an interrupt from the other system. Hence, also the command from the other system can be handled in a similar manner of handling a command generated within the system. Moreover, since the portion where data is exchanged between the systems is restricted to the inside of the interface configured to include the above-described command-relaying means and shared memory, the security can easily be maintained against, for example, a hazardous program or a program not sufficiently verified.

According a preferable mode of the above-described program-executing apparatus, discrete memory fields are individually set in the shared memory for the systems; and the command-relaying means of each of the systems is set to access the memory field corresponding to the other system when the one system performs the write control and to access the memory field corresponding to the local system when the other system performs the read control. According to this configuration, the command transmission and reception between the systems can be controlled in units of a command-transmission direction. As such, for example, in a condition in which a read of a command sent from the other system is not yet completed in the one system, even when a process requiring a function of the other system occurs, a command can be written to the shared memory without causing problem.

According to another preferable mode, each of the memory fields of the shared memory is set with a command storage field for storing a command issued to the other system, and a data storage field for storing data for a plurality of commands that is to be referenced in processing performed according to the individual commands. In addition, the command-relaying means of each of the systems is set such that in the write control, after performing a write of reference data required to be referenced in processing requested to the other system for execution into the data storage field for the other system, command-relaying means executes a process of writing the command and a storage location of the reference data into the command storage field; and in the read control, after performing a read of the storage location of the command and the reference data from the command storage field for the local system in response to the interrupt, the command-relaying means clears the command storage field and then executes a process of reading the reference data.

According to the above-described mode, when a process requiring a function of the other system has occurred in the one system, after referenced data in the process is first written into the data storage field of the other system, a command specifying the process and a storage location of the reference data are written into the command storage field. In response to the occurrence of an interrupt, the remote system fetches the command and the storage location from the command storage field of the local system, and then clears the command storage field. After that, the remote system performs a read of the reference data, and executes the process corresponding to the command. The above-mentioned "reference data" refers to, for example, numeric values and character strings that are to be subjected to a process indicated in the command, and data indicative of referenced resources (such as the storage location of processing-target data and the address of a connection destination in communication).

According to the above-described configuration, in a case where processes requiring a function of the other system occur in series in the system on the processing side, even when a read of reference data of a previously accepted command is not yet completed, a command for a subsequent process can be accepted. That is, since a plurality of processes can be parallely executed, the processing speed can be even more improved.

To execute the above-described mode, the shared memory of each of the systems needs to be imparted with a capacity sufficient in order to store the reference data regarding the plurality of processes. In addition, for a large volume of processing-target data, it is preferable that the data be segmented in units of a predetermined volume and the segmented data be serially transmitted.

In addition, according to the present invention, a portable information processing apparatus capable of executing high-speed processing can be provided at a low cost by building thus-configured program-executing apparatus into the apparatus.

For example, suppose the portable information processing apparatus is a portable telephone. In this case, for example, the one system is connected to a computer network such as the Internet, thereby enabling the system to perform processing associated with major functions of the apparatus. When the other system is configured to be a system according to a virtual-machine execution environment such as Java™, processing requiring complicated control, such as display of motion images and operation of game applications, can be implemented at a high speed.

According to above-described configuration, a control section can easily be configured by coupling the virtual-machine-dedicated operation circuit and the shared memory to the operation circuit similar to an existing model. Furthermore, since the system on the existing operation circuit can be configured in such a manner that software configuring the command-relaying means is built in and the environment for operating the software is set, significant modification is not required for the software.

BRIEF DESCRIPTION OF THE DRAWINGS

FIG. 1 is a block diagram showing a hardware configuration of a program-executing apparatus according to an embodiment of the present invention;

FIG. 2 is an explanatory view showing the configuration including software configuring the program-executing apparatus;

FIG. 3 is an explanatory view showing the configuration for intersystem command exchange and flows of the commands;

FIG. 4 is an explanatory view showing data configurations in a command register and a command data field;

DESCRIPTION OF THE PREFERRED EMBODIMENTS

Figure 5:
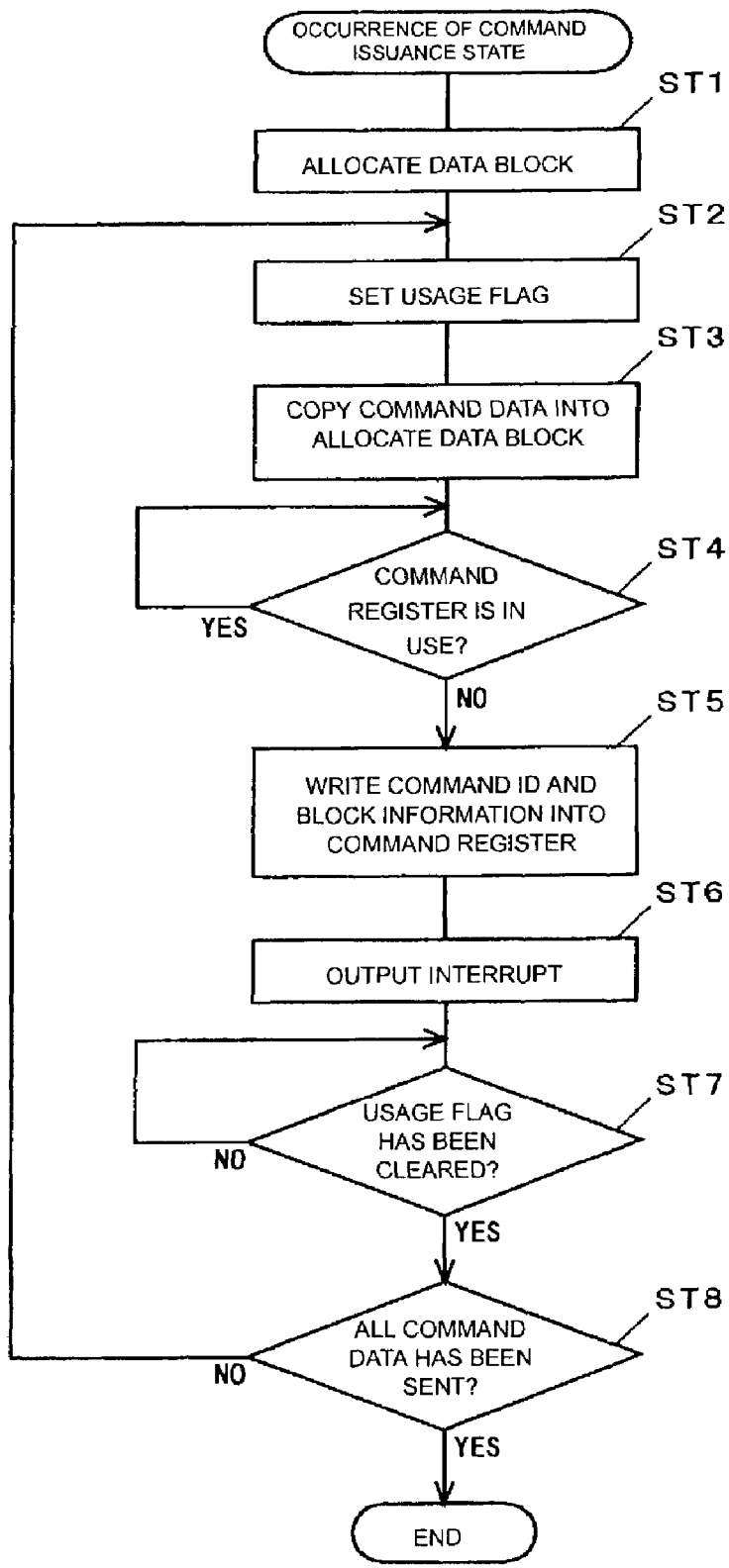
FIG. 5 is a flowchart showing processing steps through an interface of a command-issuing side system.

FIG. 1 shows a hardware configuration of a program-executing apparatus according to an embodiment of the present invention. The program-executing apparatus is built into a device functioning as a control section of a portable information processing apparatus such as a portable telephone and a PDA, and is configured to include a first apparatus 1 (which hereinbelow will be referred to as a "host-system executing apparatus 1") for performing information processing associated with major functions of the apparatus, a second apparatus 2 (which hereinbelow will be referred to as a "virtual-machine executing apparatus 2") including a virtual-machine execution environment for performing information processing associated with functions optionally imparted to the apparatus, and a dual-port RAM 3 (which hereinbelow will be referred as a "DPRAM 3" for short) that functions as a shared memory between the aforementioned apparatuses.

The host-system executing apparatus 1 includes an operation circuit 15 configured to include a CPU 11, a RAM 12, and a ROM 13, and peripheral devices such as external memories and an input/output section (which are collectively shown as "devices 14" in the figure). Similarly, the virtual-machine executing apparatus 2 includes an operation circuit 25 configured to include a CPU 21, a RAM 22, and a ROM 23, and "devices 26". The operation circuit 15 of the host-system executing apparatus 1 is formed of a general-purpose circuit that is similar to the conventional circuit built into an apparatus such as a portable telephone or a PDA. However, the operation circuit 25 in the virtual-machine executing apparatus 2 employs a Java™-dedicated operation circuit that uses a byte code as a native code.

The operation circuits 15 and 25 have a relationship in which the respective CPUs 11 and 21 are coupled via a general-purpose bus 4, and in addition, the DPRAM 3 is coupled to the general-purpose bus 4. As will be described below in detail, the DPRAM 3 is used such that when a necessity arises in the system of the one apparatus for requesting the system of the other apparatus to perform processing, a command indicative of the contents of the processing is transferred to the remote system, and the processing result is passed to the request-source system.

FIG. 2 shows a software configuration of the program-executing apparatus described above. With programs built into, for example, the ROMs 13 and 23 of the operation circuits 15 and 25 and external memories, predetermined program execution environments are individually set into the host-system executing apparatus 1 and the virtual-machine executing apparatus 2.

In the host-system executing apparatus 1, there are built a real-time OS 16 (which hereinbelow will be referred to as a "general-purpose OS 161") like ITRON as an OS. In addition, there are built components such as a device driver 17 used to control the intrasystem devices, and software that configures, for example, a subsystem interface 18 described below. In the host-system executing apparatus 1, a system 100 (which hereinbelow will be referred to as a "host system 100") that has a program execution environment compatible with the general-purpose OS 16 is set with the aforementioned software, whereby an existing-system dedicated application(s) 19 written using semantics of the general-purpose OS 16 is driven.

In the virtual-machine executing apparatus 2 of the other side, there are built a virtual-machine-execution-environment dedicated OS 26 used to execute the byte code in association with the hardware; and in addition, there are built a device driver 27, and a host-system interface 28. According to this configuration, a system 200 (which hereinbelow will be referred to as a "subsystem 200") having a virtual-machine execution environment is set, whereby a virtual-machine dedicated application(s) 29 having the Java source code is driven.

The applications 19 and 29 of the respective systems 100 and 200 are set to operate by requesting necessary processing to the local OSs 16 and 26. When one of the local OSs 16 and 26 performs processing using only the functions of the local system, it references resources in the local system, and executes the necessary processing regardless of the operation of the other OS.

When an necessity arises in the system for performing processing using a function of the other system, the subsystem interface 18, host-system interface 28, and the like are activated, and commands are exchanged between the interfaces 18 and 28 via the DPRAM 3. Thereby, the system commands the remote system to perform the required processing, and fetches the processing result therefrom.

FIG. 3 shows a detailed configuration of portions of the program-executing apparatus in which data is exchanged between the two systems.

Referring to FIG. 3, a portion (shown in symbol 5) enclosed by a dotted-line frame as a "command interface" corresponds to a relay section between the systems. The relay section is configured to include the subsystem interface 18 of the host system 100, the host-system interface 28 of the subsystem 200, and the DPRAM 3.

Either the subsystem interface 18 or the host-system interface 28 includes a function of issuing a command that drives the remote system to execute processing required in the local system, and a function of reading the command issued from the remote system and requesting the OS 16 or 26 for processing according to the command. (Hereinbelow, the subsystem interface 18 or the host-system interface 28 will simply be referred to as "interface" unless it needs to be identified).

Although the DPRAM 3 is a memory capable of accepting access performed from the two systems, it is used in the present case as a portion where commands issued by the interface of the one system are passed to the other system. In the DPRAM 3, there are set discrete fields 51 and 52 (which hereinbelow will be referred to as dedicated memory fields 51 and 52) for the respective host system 100 and subsystem 200. These memory fields each store, for example, a command requested to the corresponding system, and reference data of the command. Each of the interfaces 18 and 28 is set such that when the command has been issued, the interface writes a command to the dedicated memory field for the remote system, and sends an interrupt notification to the remote system; and when the local system has received an interrupt notification, the interface accesses the dedicated memory field for the local system to thereby receive a command issued by the remote system.

Since the host system 100 is an existing system, a function of communication with the subsystem interface 18 may be set into only a portion of either the general-purpose OS or the device driver 17, and the existing-system dedicated application 19 need not be modified. The subsystem 200 on the other side is set to control the virtual-machine dedicated application 29 in order to communicate directly with the host-system interface 28, thereby enabling the processing speed to increase.

FIG. 3 shows a flow of processing performed when a method call is generated in each of threads 291 of the virtual-machine dedicated application 29 (the thread is shown in the figure as an "application thread(s) 291"). In this case, as shown by a single-dotted chain line in the figure, the host-system interface 28 issues a command in response to the method call, and the subsystem interface 18 fetches the command and transmits a system call to the general-purpose OS 16 of the local system.

The general-purpose OS 16 drives the device driver 17 by necessity, performs processing according to the system call, and sends processing result to the subsystem interface 18. Thereby, as in the flow shown by a double-dotted chain line in the figure, a command requesting for fetching of the aforementioned processing result is issued from the subsystem interface 18. Then, the host-system interface 28 fetches the processing result, and passes it to the application thread 291 that issued the method call. At this time, the processing requested by the application thread 291 is completed, the application thread 291 uses the processing result, and therewith executes subsequent processing.

In this way, the processing of, for example, requesting the remote system to execute processing and sending the processing result, is executed according to the command exchange between the subsystem interface 18 and the host-system interface 28. As such, in each of systems 100 and 200, when processing is requested to the other system, the contents of the processing requested from the other system are received, and the processing result is sent in response, processing performed for each of the interfaces 18 and 28 satisfies the request. In addition, since each of the interfaces 18 and 28 spontaneously fetches a command from the other system by causing interruption, the necessity of referencing the other system is eliminated, and exclusive resource control can therefore be easily implemented. When no necessity of requesting the other system for processing arises, the individual systems can be operated independently of each other. This enables the processing speed of the virtual machine to significantly increase. In addition, when no virtual-machine dedicated application 29 is operated, the virtual-machine executing apparatus 2 can be set to a standby mode, thereby enabling power consumption to be reduced.

Moreover, on the side of the existing system used as the host system 100, the subsystem interface 18 is added to the existing program execution environment, and the operation can be implemented only by setting the environment in which the subsystem interface 18 can be operated. As such, the software configuration of the host system 100 need not greatly be modified. In addition, the hardware may be coupled to, for example, the CPU 21 of the subsystem 200 and the DPRAM 3, via the general-purpose bus 4. As such, the hardware configuration on the side of the host system 100 need not be modified, thereby enabling the cost to be significantly reduced.

Ordinarily, a command issued by each of the interfaces 18 and 28 is presented by an ID representing the type of the command, and data such as numeric values and character strings to be referenced when the command is executed is added by necessity (the data hereinbelow will be referred to as "command data"). The respective dedicated memory fields 51 and 52 of the DPRAM 3 are segmented into command registers 51A and 52A and command data fields 51B and 52B for storing the ID of the command.

FIGS. 4(1) and 4(2) show data configurations of the command registers 51A and 52A and the command data fields 51B and 52B, respectively. On the other hand, the command registers 51A and 52A are each written with a command ID, and in addition, block information. The command data fields 51B and 52B are each segmented into fields in units of a predetermined data length, and one of segmented fields (which will be referred to as a "data block" in the present embodiment) is written with command data for one command.

The block information in each of the command registers 51A and 52A refers to information indicating data blocks in which command data is stored corresponding to an command ID stored in the same register in each of the command data fields 51B and 52B. However, commands can include a command of a type that does not have command data. In this case, a command of the aforementioned type is set in a state where the field of block information is empty. When command data is a small volume of data representing, for example, numeric values, the data is directly written into a storage field of the block information.

Command data include data of a type that exceeds the size of data storable in one data block. In this case, the command data is segmented into the storable data size, and the segmented pieces of data are sequentially written into predetermined data blocks. As such, a session ID for identifying the session of the command data is written into the command data field to enable the remote system to recognize the segmented command data as a series of data.

In addition, each data block contains information described below as information (which is shown as "command-data identification information" in the figure) that represents, for example, a use status of the data block and attributes of the command data.

① Data-Block Allocation Flag (Which Hereinbelow will be Referred to as a "Allocation Flag")

The allocation flag represents whether own data blocks are allocated for command exchange. From the nature of a flag, this flag is set by command-issuing one of the systems and is cleared by the remote system upon completion of a read of all the command data accompanying the command.

② Data-Block Usage Flag (Which Hereinbelow will be Referred to as a "Usage Flag" for Short)

The usage flag represents whether own data blocks are in use. This flag is set by command-issuing one of the systems when writing command data. Then, the flag is cleared by the receiving system upon completion of a read of the command data written in the data block.

③ Command Data Size

The command data size represents the size of all the command data accompanying the command.

④ Command-Data Sequence Number

The command-data sequence number is numeric value data that represents the sequential position of command data currently written in the data block in all the command data. In the command-receiving system, when command data is segmented and passed thereto, the individual items of command data are concatenated according to the command-data sequence number.

According to the present embodiment, although the command data fields 51B and 52B can be written with command data regarding a plurality of commands by using the above-described plurality of data blocks, each of the command registers 51A and 52A is set to store only one command either in the system 100 or 200. However, as described below, when the interfaces 18 and 28 have each read a command from each of the command registers 51A and 52A according to an interrupt, the command registers 51A and 52B are each cleared before the command data is read. As such, even when commands are issued in series, the system can operate without causing much delay in processing of, for example, the application or the device.

Figure 6:
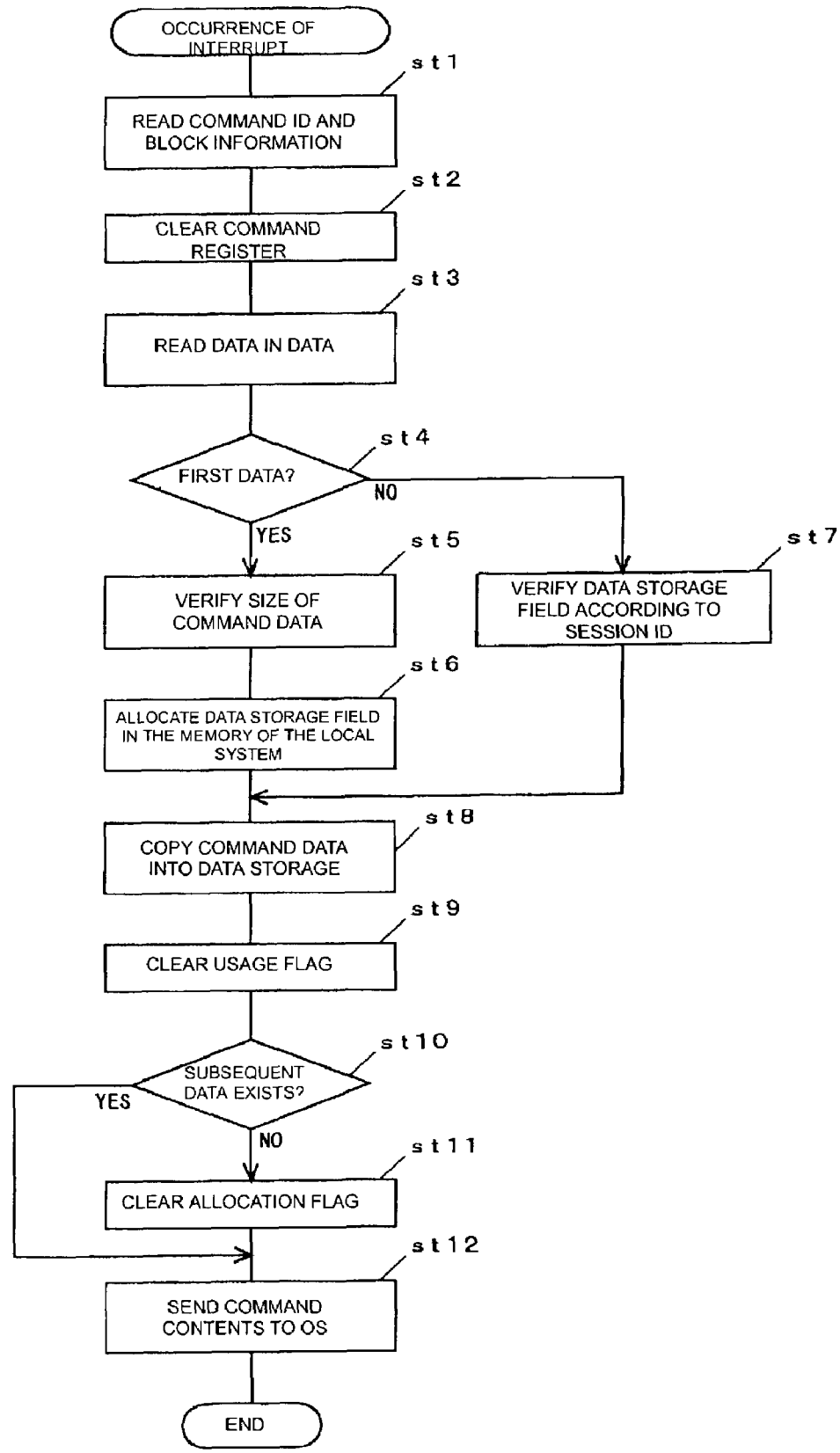
FIG. 6 is a flowchart showing processing steps to be carried out through an interface of a command-receiving side system.

Hereinbelow, a detailed description will be made regarding processing performed in each of the interfaces when command exchange is performed. FIG. 5 shows processing steps to be carried out by the interface of the system that issues a command (the system hereinbelow will be referred to as an "issuing system"), in which each of the processing steps is shown by "ST". FIG. 6 shows processing steps to be carried out by the interface of the system that receives the command (the system hereinbelow will be referred to as a "remote system"), in which each of the processing steps is shown by "st".

The processing steps shown in each of FIGS. 5 and 6 are those to be carried out only when command data is written to the command data fields 51B and 52B.

First, a description will be made regarding processing steps in the case where the command data is storable into one data block. When one of the interfaces becomes ready for issuing a command to the remote system, the interface of the system is activated to start the processing steps shown in FIG. 5. In ST1, the interface accesses the remote-system dedicated memory field of the DPRAM 3, searches the memory field for an unused data block, and sets a block allocation flag into the free block. Subsequently, in ST2, the system sets the usage flag into the allocated data block; and in ST3, the interface copies command data generated in the system into the data block. In the aforementioned ST3, concurrently with the copying operation, the interface writes data items of the above-described session ID, command data size, and command-data sequence number.

Subsequently, in ST4 the interface checks whether the command register of the remote system is in use. If data other than "0" is stored in the command register, the interface assumes the command register to be in use, and enters into a standby state and stays therein until the register is cleared. When the command register is cleared, processing proceeds to ST5, and the interface writes a command ID and block information indicating the storage location for the command data into the command register. Thereafter, in ST6 the interface outputs an interrupt to the remote system.

After having output the interrupt, the interface enters a standby state and stays therein until the usage flag of the data block is cleared by the remote system. When the usage flag is cleared, ST7 resolves to "YES", and processing proceeds to ST8. The interface then performs verification for completion of transmission of the command data, and processing terminates after the verification.

Subsequently, the remote system receives the interrupt that has been output in ST6, thereby activates the interface, and starts the steps shown in FIG. 6. First, in st1 the interface accesses the dedicated memory field for the local system, and thereby reads the command ID and the block information from the command register. In this case, and the interface immediately stores the read-out information into a buffer or the like of the local system. Processing then proceeds to st2, and the command register is cleared in the step.

Subsequently, in st3 the interface verifies the data block in which the command data is stored according to the block information, and reads the individual data items of the data block. Then, in st4 the interface verifies as to whether the read-out data is the first transmission data according to, for example, the aforementioned session ID and command-data size sequence number. If the data is the first data, processing proceeds to st5, and the interface verifies the size of the aforementioned command data in the step. Subsequently, in st6 a data storage field for the size of the command-data is allocated in the memory such as the RAM of the local system, and processing proceeds to st8. Then, the interface copies the read-out command data into a first position of the data storage field.

After that, in st9 the interface clears the usage flag of the data block, and in addition, checks whether subsequent command data exits in st10. In the present case, since the command data is assumed to have the size storable into one data block, st10 resolves to "NO", and processing proceeds to st11, and the interface clears also the allocation flag of the data block in the step. Moreover, in st12 the interface transmits the command contents represented by the aforementioned command ID and command data to the OS of the local system, and processing then terminates.

Hereinbelow, a description will be made regarding processing steps to be carried out when command data is segmented and stored. In this case, the interface of the issuing system allocates a predetermined data block in ST1 to ST5 shown in FIG. 5, and thereby writes the command data thereinto. In this case, the interface sequentially fetches command data, which is to be transmitted, for one data block, and copies the data into the data block. Then, in the state of preserving the remaining data into the memory of the local system, the interface executes the processing in ST4 and subsequent steps.

In the remote system, similar to the above, the processes in st1 to st9 are executed according to the occurrence of interrupts. In this case, however, since the determination of the subsequent step st10 resolves to "YES", processing terminates without performing the clearing process in still for the allocation flag.

During the above processing, in the interface of the issuing system, after the usage flag is verified to have been cleared in ST7 shown in FIG. 5, the determination of ST8 resolves to "NO", and processing returns to ST2. At this time, as described above, the data block allocated at the time of the previous command issuance is preserved in such a manner that the remote system skips the step of clearing the allocation flag. As such, the interface sets the usage flag again into the aforementioned allocated data block, fetches subsequent command data from the aforementioned memory, and copies the data into the aforementioned data block. Thereafter, similarly to the steps in the previous flow, the interface writes the command ID and the block information again into the command register, and outputs an interrupt to the remote system.

In response to the second interrupt, similar to the previous case, the remote system activates the interface and thereby starts the steps shown in FIG. 6. Then, similar to the previous case, the interface carries out st1 to st3, thereby retrieves the command ID, and reads data in the data block. Thereafter, the determination of st4 resolves to "NO", and processing proceeds to st7; and according to the aforementioned session ID, the interface then verifies data storage field allocated when the first command has been received. Subsequently, processing proceeds to st8; and in the verified data storage field, the interface copies the second command data to the end of the previously copied command data. Thereafter, the usage flag is cleared in st9, and processing then proceeds from st10 to st12. In these steps, the interface transmits the command ID and the command data to the OS, and processing terminates.

After the above-described processing, processing is iterated in steps similar to those shown in FIGS. 5 and 6 until the completion of transmission of the last command data. In the issuing system, after the interface has issued the last command and thereby outputs an interrupt to the remote system, command-issuance processing terminates after the completion of the step of clearing the usage flag (ST7 and ST8). In the remote system, for the issuance of the last command, after the usage flag is cleared, processing proceeds from st10 to st11, also the allocation flag is cleared. Thereafter, the contents of the last command are transmitted to the OS, and then command-receipt processing terminates.

When a command without command data has been issued, as described below, the interface of the issuing system writes data into the command register, and then outputs an interrupt. According to the interrupt, the interface of the remote system reads the data from the command register, and then transmits the contents of the command ID to the OS. According to the above-described processing, even during the transmission of a command having a large amount of command data, a short command not requiring command data is issued, and the command can be preferentially executed. For example, a case can occur in which the subsystem 200 requests the host system 100 to transmit a large amount of data such as stream data, and a key event for activating the other virtual-machine dedicated application 29 during reception of the transmission. In this case, for example, a request for processing in the latter can be transmitted by interruption to the former during processing, thus enabling high-speed processing to be implemented for a command for which a response function is required.

Hereinbelow, a description will be made regarding a detailed example of processing implemented by functions of the command interface 5. For example, when the program-executing apparatus is built into a portable telephone, the host system 100 executes processes, similar to those performed by the conventional model, such as a process of accepting various key operations, the process of communication, and the process of displaying the contents of key operations and data retrieved through communication. The subsystem 200 on the other side drives, for example, a game application, and performs a process of displaying motion images and scores; and concurrently, when a key event has occurred, it receives a transmission of the contents of operated keys from the host system 100. In addition, in a case where font data used to display characters is fetched or where a network needs to be accessed, the subsystem 200 uses functions of the host system 100.

Figure 8:
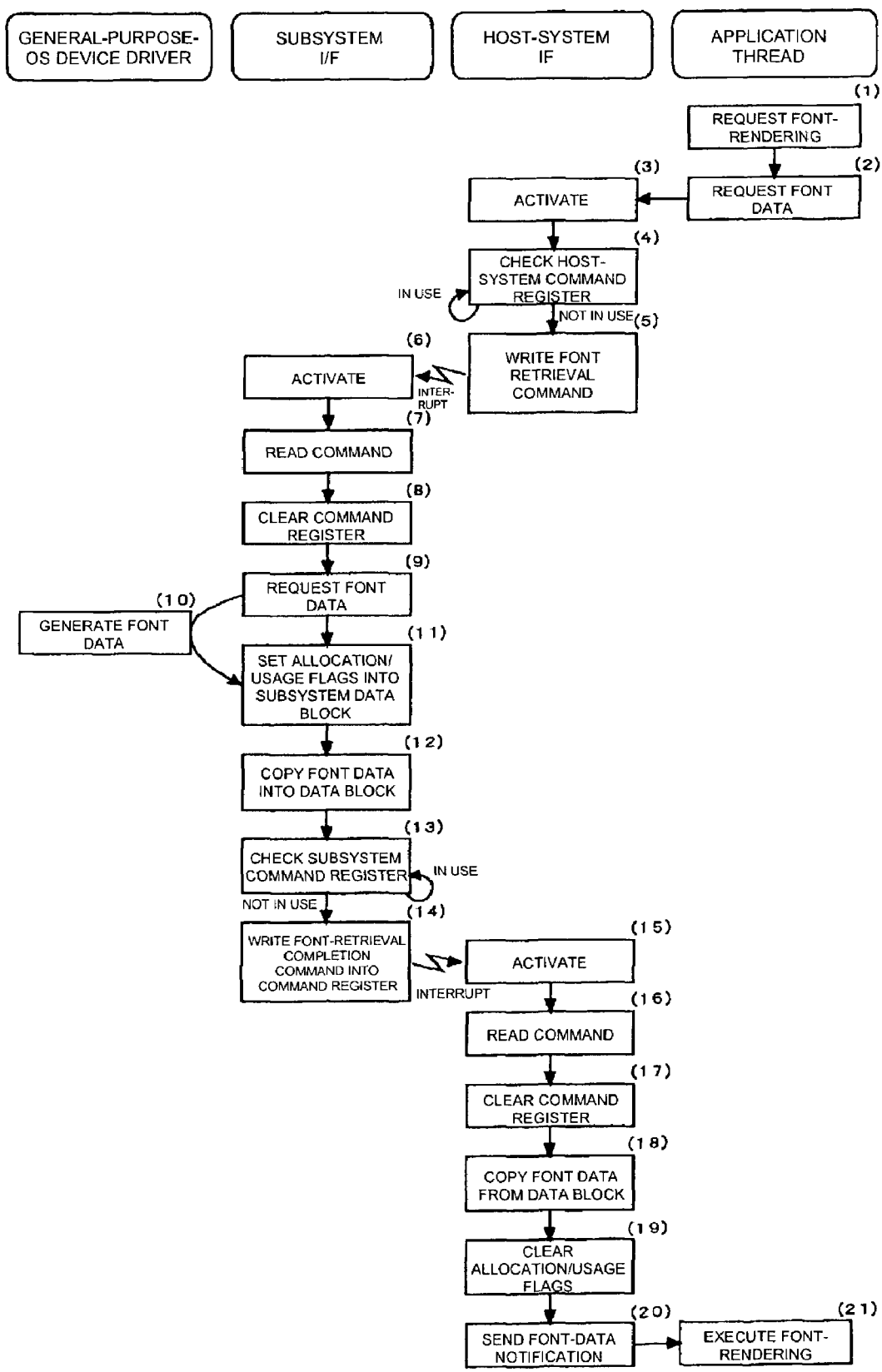
FIG. 8 is an explanatory view showing a detailed flow of intersystem command processing.
Figure 9:
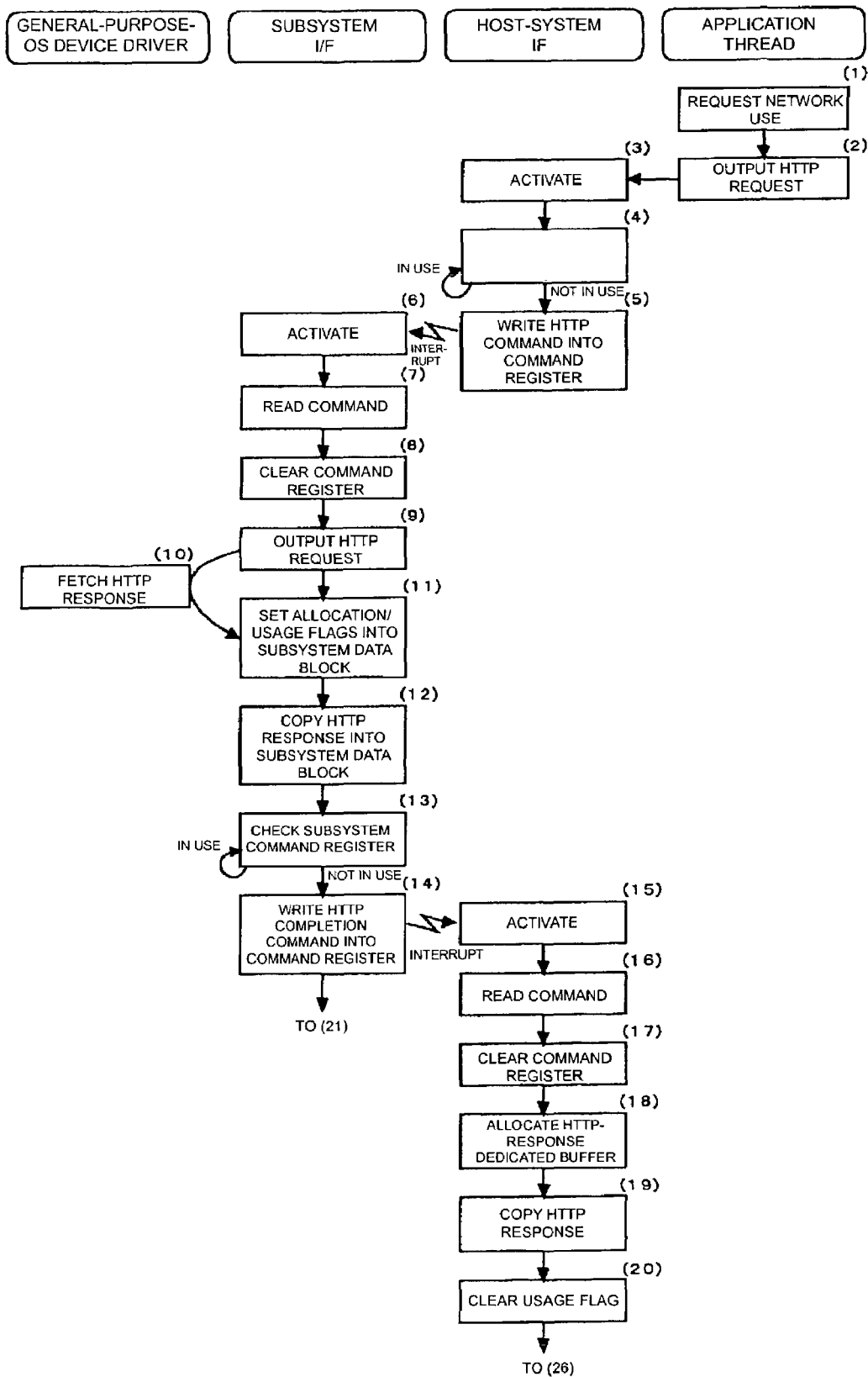
FIG. 9 is an explanatory view showing a detailed flow of intersystem command processing.
Figure 10:
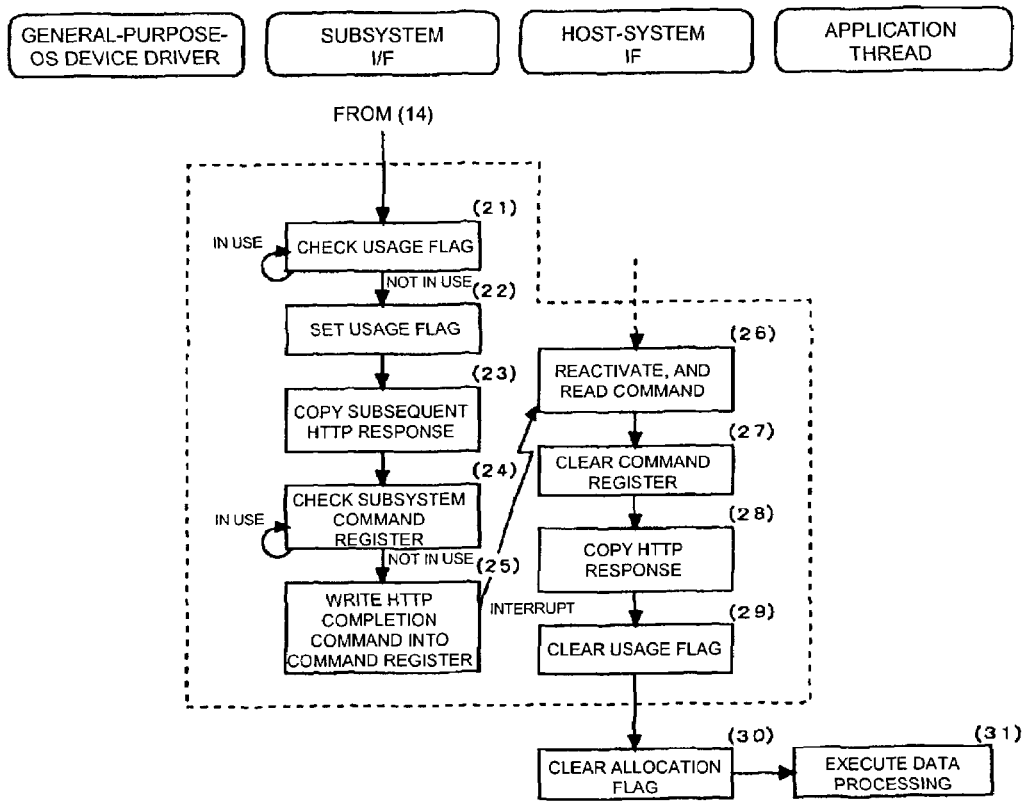
FIG. 10 is an explanatory view showing a detailed flow of the intersystem command processing.
Figure 11:
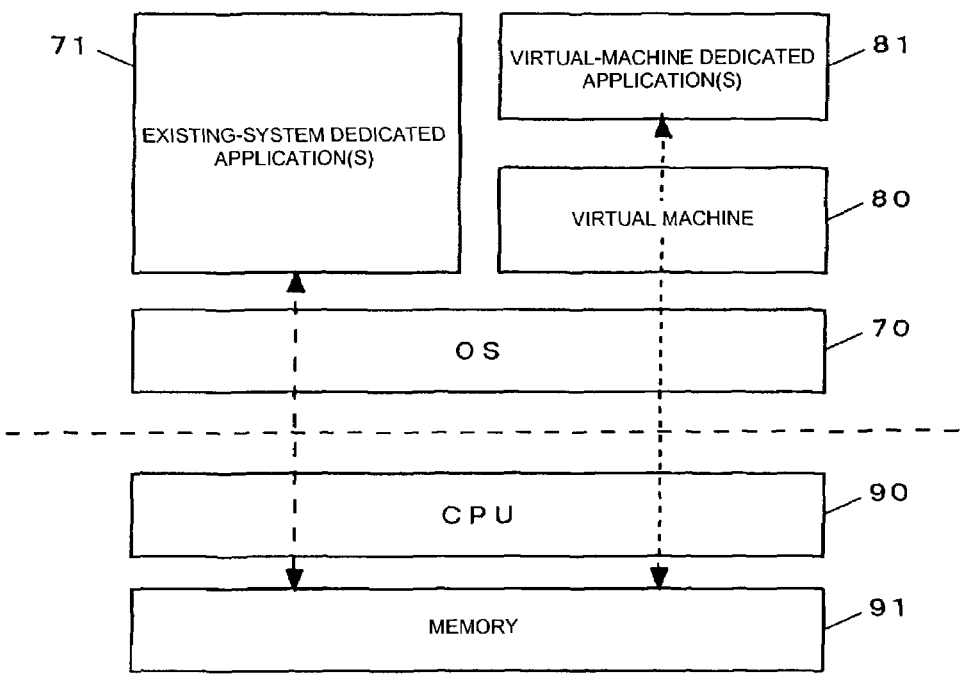
FIG. 11 is an explanatory view showing the configuration of a conventional program-executing apparatus.
Figure 12:
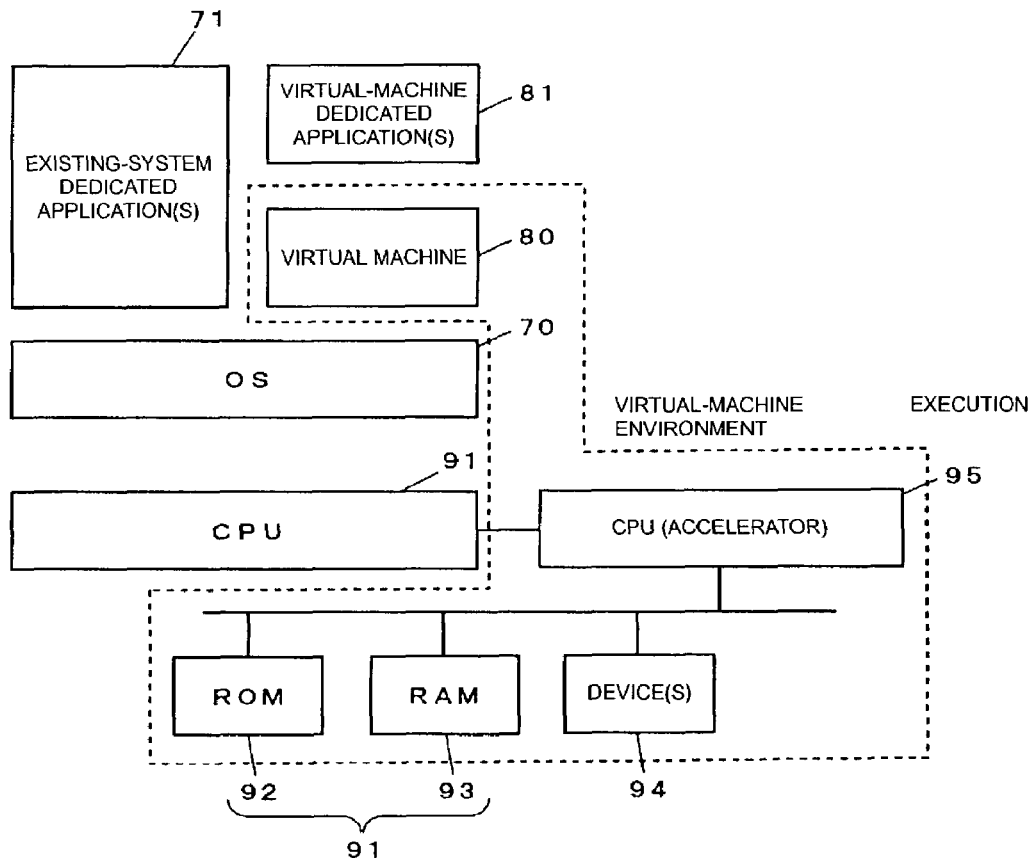
FIG. 12 is an explanatory view showing the configuration of a conventional program-executing apparatus.
Figure 13:
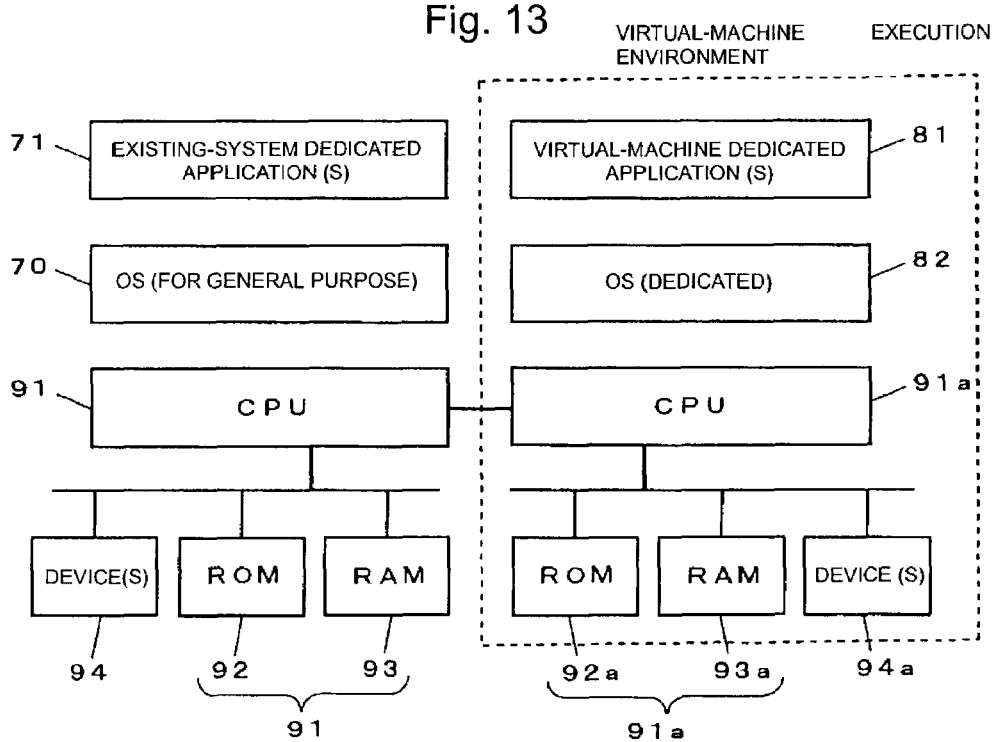
FIG. 13 is an explanatory view showing the configuration of a conventional program-executing apparatus.

As such, hereinbelow, a description will be made regarding processing flows in the two systems with reference to examples of processing to be performed when the subsystem 200 needs to use font data (FIG. 7), processing to be performed when a key event has occurred (FIG. 8), and processing to be performed a network needs to be accessed (FIGS. 9 and 10). In FIGS. 7 to 10, based on the configuration shown in FIG. 3, processing flows in individual portions are associated for the subsystem interface 18 and the host-system interface 28; and in addition, the general-purpose OS 16 and the device driver 17 in the host system 100, and the application thread 291 in the subsystem 200. Individual processes are shown with sequential reference numerals (each in a set of parentheses). (The reference numerals will also be used in the description given below).

(A) Processing to be Performed when a Key Event has Occurred

Figure 7:
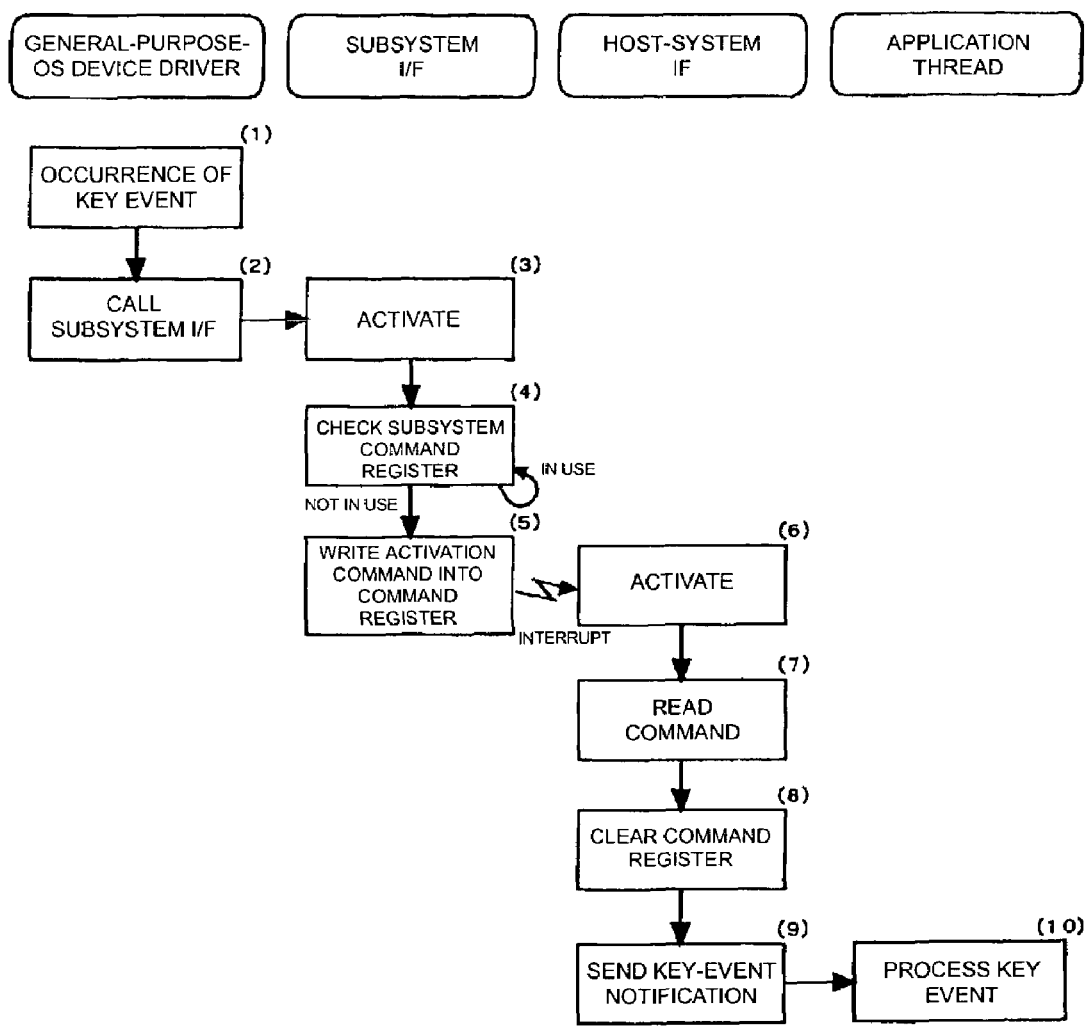
FIG. 7 is an explanatory view showing a detailed flow of intersystem command processing.

In FIG. 7, the illustrated state is assumed such that a user has performed key operations for the virtual-machine dedicated application 29 in the subsystem 200 to execute a process. In this case, first, the contents of the key event are read by, for example, the device driver 17 or the general-purpose OS 16 of the host system 100 ((1)). Then, the general-purpose OS 16 activates the subsystem interface 18 and controls it to start command-issuance processing ((2) and (3)).

Upon receipt of the contents of the key event from the general-purpose OS 16, the subsystem interface 18 checks the command register 52A. When the command register 52A becomes an unused state, the subsystem interface 18 writes a command ID of an activation command thereinto (the interface immediately writes it when the command register is found in the checking to be in an unused state; or when the command register is found to be in a used state, the interface enters a standby state and stays therein until the command register becomes to be an unused state); and then, the interface outputs an interrupt to the subsystem 200 ((4) and (5)). In the present case, the assumption is made such that reference data of the activation command is sized to be writable as block information, but a write thereof into the command data field is not performed.

In the subsystem 200, the interrupt is received, the host-system interface 28 is activated, and the command ID is written into the command register 52A of the local system is read thereby ((6) and (7)). In addition, the host-system interface 28 clears the command register 52A, and posts a notification on the aforementioned key event via the virtual-machine-execution-environment dedicated OS 26 into the application thread 291 currently operating ((8) and (9)). Having received the aforementioned notification, the application thread 291 recognizes the contents of the key event, and executes processing corresponding to the event ((10)).

(B) Processing that Uses Font Data

FIG. 8 shows processing to be performed when a rendering process using font data is performed with the application thread 291 set in the subsystem 200. When a request occurs for the rendering process, the application thread 291 outputs a command that requests font data necessary for the host-system interface 28 of the local system ((1) and (2)). The host-system interface 28 activated in response to the request checks the command register 51A of the host system 100 ((3) and (4)). When the command register 51A has entered an unused state, the interface writes a command ID of the font retrieval command thereinto, and outputs an interrupt to the host system 100 ((5)). As in the case of the activation command, also referenced data of the font retrieval command is assumed such that the command does not require a write of command data.

In the host system 100, the subsystem interface 18 is activated in response to the aforementioned interrupt, and the aforementioned command ID is read from the command register 51A of the local system ((6) and (7)). After clearing the command register 51A, the subsystem interface 18 outputs a request for font data to the general-purpose OS 16 of the local system ((8) and (9)).

In response to the aforementioned request, the general-purpose OS 16 generates the specified font data and transmits it to the subsystem interface 18. Having received the aforementioned transmission, the subsystem interface 18 sets the allocation flag and the usage flag into an empty data block of the command data field 52B of the subsystem 200; and thereafter, it copies the font data, which has been passed from the general-purpose OS 16, into the aforementioned data block ((11) and (12)). In addition, the subsystem interface 18 checks the command register 52A. When the command register 52A is emptied, the subsystem interface 18 writes, for example, a command ID of a font-retrieval completion command and a data block location into which the aforementioned font data is copied; and thereafter, it outputs an interrupt to the subsystem 200 ((13) and (14)).

In the subsystem 200, the host-system interface 28 is reactivated in response to the aforementioned interrupt, and data such as the command ID and block information is read thereby from the command register 52A of the local system ((15) and (16)). In addition, the host-system interface 28 clears the command register 52A, accesses the data block into which the aforementioned font data is written, reads the font data written in the block, and copies it into the memory of the local system ((17) and (18)).

The font data is fixed-length data. As such, in (18) a storage field of a size corresponding to the size of the font data is allocated, and then the font data is copied.

After that, the host-system interface 28 clears the allocation flag and the usage flag in the aforementioned data block, and sends a notification on the storage location of the retrieved font data to the application thread 291 ((19) and (20)). The application thread 291 receives the font data through a series of the aforementioned processes, and executes the rendering process ((21)).

(C) Processing to be Performed when a Network Needs to be Accessed

FIGS. 9 and 10 shows a case assumed such that processing requiring connection to the Internet has occurred in the application thread 291 in the subsystem 200. In addition, in processing shown in FIG. 9, an assumption is made such that a large amount of data is retrieved through the net connection; and processes in the portion enclosed in a dotted-line frame in the figure are iterated by the number of segments of command data.

First, the application thread 291 outputs a command (HTTP request) that specifies a predetermined URL and that requests the connection ((1) and (2)). The host-system interface 28 is activated in response to the request, and checks the command register 51A of the host system 100 ((3)). When the command register 51A is emptied, the host-system interface 28 writes a command ID of a command (HTTP command) that requests connection to the aforementioned specified URL as the above-described block information, and outputs an interrupt to the host system 100 ((4) and (5)).

Subsequently, in the host system 100, the subsystem interface 18 is activated in response to the aforementioned interrupt, and reads the command from the command register 51A of the local system ((6) and (7)). In addition, the subsystem interface 18 clears the command register 51A, and then outputs the HTTP request to the general-purpose OS 16 ((8) and (9)).

In response to the aforementioned request, the general-purpose OS 16 controls a communication circuit to be active, transmits the specified URL therethrough, and fetches response data (HTTP response) from the net side ((10)). As in the case of the aforementioned font data, the subsystem interface 18 sets the usage flag, the allocation flag, and the like into an empty data block in the command data field 51B of the subsystem 200, and copies a first position of the response data ((11) and (12)).

After the above, the subsystem interface 18 checks the command register 52A in the subsystem 200. When the command register 52A is emptied, the subsystem interface 18 writes thereinto a command (HTTP completion command) that is indicative of completion of the fetching of the response data, and outputs an interrupt to the subsystem 200 ((13) and (14)). In the command-writing process, in addition to a command ID, block information of the data block into which the first response data is written.

In the subsystem 200, the host-system interface 28 is reactivated in response to the aforementioned interrupt, and the HTTP completion command is read thereby from the aforementioned command register ((15) and (16)). In addition, the host-system interface 28 clears the command register 52A of the local system, accesses the data block into which the response data is written, thereby checks the whole data size of the command data according to the block information included in the aforementioned HTTP completion command, and allocates a storage field in the memory of the local system for the aforementioned response data ((17) and (18)). Then, the interface stores copies the response data in the aforementioned data block into the data storage field, and then clears the usage flag set in the data block ((19) and (20)).

After having written the aforementioned HTTP completion command, the subsystem interface 18 is in the state of continuously checking the usage flag. When the usage flag is cleared, the interface sets the flag again, and copies subsequent response data ((21) to (23)). Then, the interface checks the command register 52A of the local system, writes a HTTP completion command again when the command register 52A is emptied, and outputs an interrupt to the subsystem 200 ((24) and (25)). In the subsystem 200, which has received the interrupt, the host-system interface 28 is reactivated; and similar to the previous round, the interface performs processes in the order of reading of the command, clearing of the command register, copying of the response data, and clearing the usage flag.

As shown in below, similarly, the processes in (21) to (29) are iterated until all response data is passed to the subsystem 200. After completion of the transmission of the response data, the host-system interface 28 clears the allocation flag and sends a notification on the process completion to the application thread 291 ((30)). The completion notification indicates the location in which the aforementioned response data is stored. The application thread 291 reads the response data from the location, and executes necessary data processing ((31)).

The aforementioned completion notification corresponds to the process in st12 shown in FIG. 6. As such, when the processing is configured such that a completion notification is issued each time response data corresponding to one block is obtained according to the steps shown in FIG. 6, the application thread 291 can be controlled to perform data processing in parallel to the fetching of data.

In the above-described example, the method is arranged such that a large amount of command data is segmented into the same data block. However, instead of the method, the processing may be configured such that a plurality of data blocks corresponding to the data sizes of response data into the command data field 52B, and the response data is written at one time; and thereafter, commands are issued while sequentially modifying the block information in order.

According to the present invention, two types of systems that operate in differently configured program execution environment are set into discrete arithmetic circuits, and the individual systems are operated independently of each other, thereby enabling the speed of processing to be improved. Furthermore, since a command-relaying means of each of the systems receives a command from the other system in response to an interrupt via a shared memory coupled to a path connecting the individual operation circuits, command processing to be performed inside and the outside of the system can be integrated, exclusive resource control can be simplified, and the processing speed can thereby be further improved. Still furthermore, only the shared memory is used to share between the systems, and communication with the other system is restrictively performed only with the command-relaying means; therefore, a program-executing apparatus exhibiting high security can be provided.

Still furthermore, according to the present invention, by using the program-executing apparatus configured as described above to function as a control section of a portable information processing apparatus, an existing operation circuit can be used as it is, thereby enabling a control section having a virtual-machine execution environment to easily be provided. Yet furthermore, since software and hardware configurations in an existing operation circuit need not be greatly modified, a portable information processing apparatus capable of executing various optional functions at high speed can be provided at a low cost.

What is claimed is:

1. A program-executing apparatus configured such that mutually different program execution environments are individually set into two types of operation circuits as first and second systems that are connected together, comprising:
   a shared memory usable by the two types of operation circuits connected to a path connecting the individual operation circuits, wherein the shared memory comprises one or more memory fields, each memory field comprising:
      a command storage field for storing a command issued to the second system; and
      a data storage field for storing data associated with one or more commands; and
   a command-relaying means in each of the systems,
   wherein when a process requested from the first system to the second system has occurred, the command-relaying means executes:
      write control such that the first system writes a command indicative of the contents of the process into the shared memory and issues an interrupt request to the second system to cause an interrupt, wherein in the write control, after the first system performs a write of data into the data storage field of the second system, the command relaying means writes the command and a storage location of the data into the command storage field; and
      read control such that in response to the interrupt request, the second system performs a read of the command from the shared memory, wherein in the read control, after the second system performs a read of the command and the storage location of the data from the command storage field for the second system in response to the occurrence of the interrupt, the command-relaying means clears the command storage field and then reads the data.

2. A command-relaying method to be implemented in a program-executing apparatus configured such that mutually different program execution environments are individually set into two types of operation circuits as first and second systems that are connected together, and a shared memory usable by the two types of operation circuits is connected to a path connecting the individual operation circuits, comprising:
   writing data associated with a command into a data storage field for execution by the second system;
   writing the command, indicative of the contents of a process, into the shared memory by the first system, wherein the command and a storage location of data associated with the command are written into a command storage field;
   issuing an interrupt request in the first system to cause an interrupt in the second system;
   receiving the interrupt request and reading the command and the storage location of the data associated with the command from the command storage field by the second system in response to the interrupt;
   clearing the command storage field after the reading; and
   reading the data associated with the command according to the storage location of the data associated with the command,
   wherein the shared memory comprises one or more memory fields, each memory field comprising:
      the command storage field for storing a command; and
      the data storage field for storing data associated with one or more commands; and
   wherein the first system requests processing to the second system.

3. A portable information processing apparatus, comprising:
   a program-executing apparatus configured such that mutually different program execution environments are individually set into two types of operation circuits as first and second systems that are connected together, comprising:
      a shared memory usable by the two types of operation circuits connected to a path connecting the individual operation circuits, wherein the shared memory comprises one or more memory fields, each memory field comprising:
         a command storage field for storing a command issued to the second system; and
         a data storage field for storing data associated with one or more commands; and
      a command-relaying means in each of the systems,
      wherein when a process requested from the first system to the second system has occurred, the command-relaying means executes:
         write control such that the first system writes a command indicative of the contents of the process into the shared memory and issues an interrupt request to the second system to cause an interrupt, wherein in the write control, after the first system performs a write of data into the data storage field of the second system, the command relaying means writes the command and a storage location of the data into the command storage field; and
         read control such that in response to the interrupt request, the second system performs a read of the command from the shared memory, wherein in the read control, after the second system performs a read of the command and the storage location of the data from the command storage field for the second system in response to the occurrence of the interrupt, the command-relaying means clears the command storage field and then reads the data.

4. A program-executing apparatus, comprising:
   mutually different program execution environments are individually set into two types of operation circuits as first and second systems that are connected together;
   a first memory and a second memory in the first system and the second system, respectively;
   a shared memory usable by the two types of operation circuits connected to a path connecting the individual operation circuits;
   software instructions stored in the first memory and the second memory for enabling the program-executing apparatus under control of the first and second systems, to:
      write data associated with a command into a data storage field for execution by the second system;
      write the command, indicative of the contents of a process, into the shared memory by the first system, wherein the command and a storage location of data associated with the command are written into a command storage field;
      issue an interrupt request in the first system to cause an interrupt in the second system;
      receive the interrupt request and reading the command and the storage location of the data associated with the command from the command storage field by the second system in response to the interrupt;

clear the command storage field after the reading; and read the data associated with the command according to the storage location of the data associated with the command, wherein the shared memory comprises one or more memory fields, each memory field comprising:

the command storage field for storing a command; and the data storage field for storing data associated with one or more commands; and wherein the first system requests processing to the second system.

* * * * *